June 29, 1926.
A. W. MELLOWES
SEALED VALVE
Filed Feb. 25, 1921
1,590,389
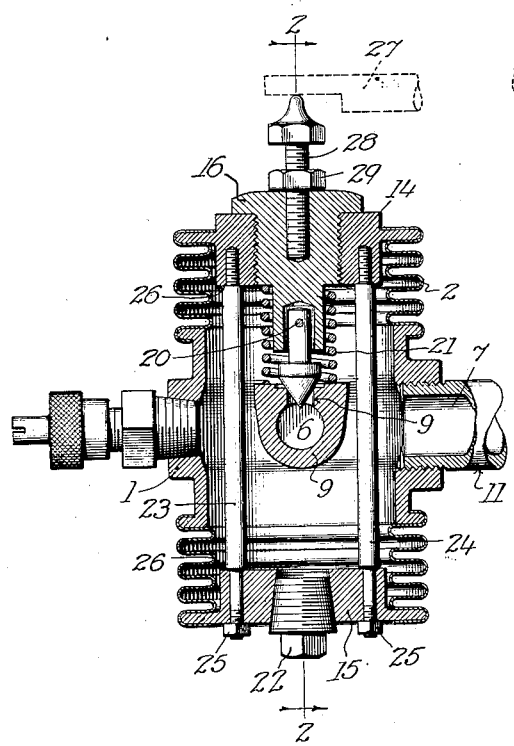
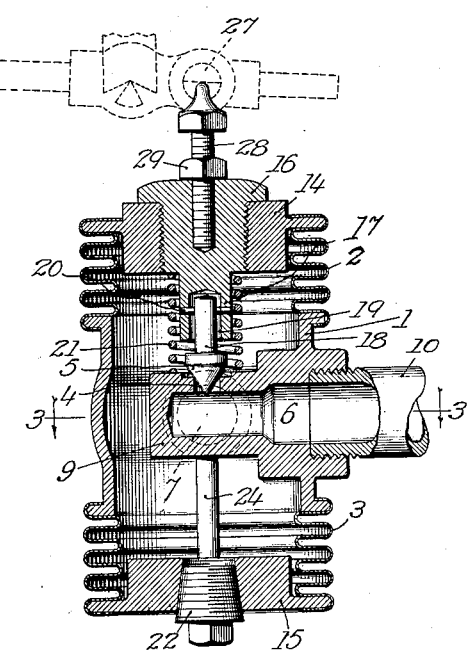
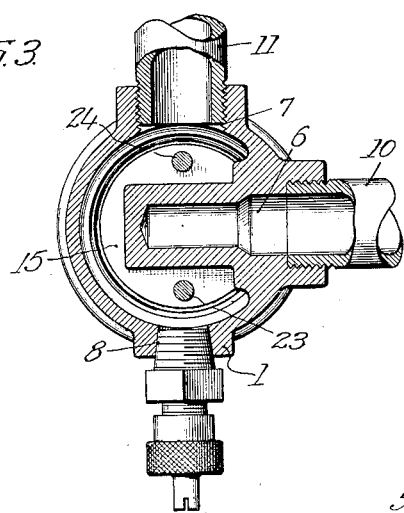
Inventor:
Alfred W. Mellowes
By Edwin B. H. Tower Jr.
Atty.

Patented June 29, 1926.

1,590,389

UNITED STATES PATENT OFFICE.

ALFRED W. MELLOWES, OF MILWAUKEE, WISCONSIN.

SEALED VALVE.

Application filed February 25, 1921. Serial No. 447,680.

This invention relates to a sealed valve.

The valve to which this invention relates is particularly suitable for use in water supply systems, although not limited to such use.

Valves heretofore constructed have been provided with a projecting valve stem around which a packing or gland is necessary to prevent leakage. Such a construction is objectionable because it is difficult, if not impossible, to prevent leakage between moving parts, and furthermore on account of the frictional resistance encountered in the movement of the stem. This resistance may at times be sufficient to prevent movement of the stem where a relatively slight force is available for operating purposes.

Among the objects of this invention is to provide a valve in which the above objectionable features are eliminated.

Another object is to provide a sealed valve.

Another object is to provide an improved self-seating and centering valve.

Another object is to provide a valve within which the pressure is balanced.

Another object is to provide a valve, simple and durable in construction, and economical to manufacture.

Another object is to provide a valve which may be operated from the exterior by a slight force, irrespective of the pressure within the valve.

Another object is to provide in a valve having a flexible casing, a balanced construction to enable the valve to be opened and closed by a slight force, independent of the pressure within the valve, and without altering the capacity of the valve chamber.

Other objects and advantages will hereinafter appear.

The views of the drawings are:

Fig. 1 is a front elevation of the valve in section.

Fig. 2 is a vertical section on line 2—2 of Fig. 1.

Fig. 3 is a horizontal section on line 3—3 of Fig. 2.

The valve comprises in general a central cylindrical body, having a flexible bellows 2 and 3, connected to the ends thereof, a valve seat 4 within the cylindrical body and a valve cone or valve head 5, movable with the bellows.

The central body 1 is provided with an inlet port 6, an outlet port 7, and a port 8 in which a testing gauge may be inserted. Extending inwardly from the cylindrical body is a hollow projection 9 forming the inlet port 6 and having the valve seat 4 arranged therein. The inlet port 6 is threaded to receive an inlet pipe 10, and the outlet port is threaded to receive an outlet pipe 11. Obviously the port 7 may be used as the inlet port and the port 6 as the outlet port, if desired.

The bellows 2 and 3 which are connected to opposite ends of the central body 1 form a flexible valve casing, the outer ends of the bellows being closed by heads 14 and 15. The bellows are preferably formed of flexible metal, but other material may be employed.

The head 14 is provided with a threaded plug 16, to which the valve cone or valve head 5 is loosely connected in order to be self-centering upon the valve seat 4. For this purpose, a projection 17 having a recess 19 therein extends downwardly from the plug 16, and an elongated end 18 of the cone 5 extends within the aperture 19, and is held in position by a loosely fitting pin 20. The sides of the recess 19 serve to limit the side movement of the cone. The valve cone or valve head 5 may be readily removed from the casing with the plug 16 for inspection or repair.

The valve may normally be held in open position by a coiled spring 21, arranged between the head 14 and the projection 9. It is, of course, understood that other arrangements may be provided, and that the valve may be normally held in closed position by arranging the spring 21 between the head 15 and the projection 9, or the spring 21 may be dispensed with. Furthermore, the plug 16 may be inserted in the head 15, if desired, instead of the head 14.

The head 15 is provided with a drain plug 22.

The heads 14 and 15 are connected by rods 23 and 24, so that the respective heads 14 and 15 move together. The upper ends of the rods 23 and 24 are threaded in the head 14, and the other ends extend through the head 15 and are there held in position by means of nuts 25. The ends of the rods 23 and 24 are provided with shoulders 26 which engage the respective heads 14 and 15 to hold them in spaced relation. It is to be understood, however, that other means may be provided for connecting the heads 14 and 15 so that they move simultaneously and in the same direction. By providing such a connection between the two heads, a balanced construction is provided which enables the valve opening to be changed by a relatively slight force applied from the exterior of the valve.

The valve opening may be varied by moving the head 14 to which the valve cone 5 is connected. A force exterior to the valve may be communicated to the head 14 through an arm 27, which is connected to a controlling device such as disclosed in copending application Serial No. 457,581 filed April 1, 1921. A lock nut 29 is provided to hold the set screw 28 in adjusted position in the plug 16. The upper end of the set screw will normally be held in contact with the arm 27 by means of the spring 21, so that the position of the valve cone 5, which regulates the valve opening, will be controlled by the arm 27.

The strength of the spring 21 need only be sufficient to overcome the inherent stiffness or retarding action of the bellows 2 and 3. If it is not desired to normally maintain the valve in either an open or a closed position, the spring 21 may be dispensed with. Under the latter condition, the only force required to be overcome in varying the valve opening would be the resistance offered by the flexible bellows.

When the valve opening is varied, the heads 14 and 15 are moved simultaneously in the same direction, which movement causes one of the bellows to contract and the other bellows to expand, thus permitting a substantially constant capacity chamber to be maintained for different positions of the valve cone. Furthermore, by rigidly connecting the heads 14 and 15, any tendency for a change of pressure within the valve chamber to move the valve cone is eliminated.

One advantage of a flexible diaphragm or bellows valve casing of the character described, is that a relatively constant capacity valve chamber is maintained for different positions of the flexible casing. This permits the valve cone to move with the heads, without encountering increased resistance, as with the usual diaphragm valve. In the diaphragm valve as ordinarily constructed, when the diaphragm is moved inward, the capacity of the valve chamber is decreased so that a certain amount of resistance is encountered in the movement of the diaphragm in compressing the liquid or gas within the valve.

While but one embodiment of the invention has been shown, it is to be understood that various changes and adaptations may be made of the invention contained herein.

The invention claimed is:

1. A sealed valve comprising a fixed body having a valve seat, flexible portions connected to opposite sides of the body on the outlet side of the valve to form a sealed chamber, and a valve head for the seat arranged to move with the flexible portions.

2. In a valve having a plurality of flexible members with a casing fixed therebetween arranged to form a sealed valve chamber, means connecting the outer ends of the flexible members to effect simultaneous movement thereof for maintaining a constant capacity valve chamber for all positions of the flexible members.

3. A valve casing comprising a fixed central body open at opposite sides, a hollow projection extending therein, a valve seat in said projection, a plurality of flexible portions connected to said opposite sides of the central body and on the same side of said valve seat, and means to effect simultaneous contraction and expansion of the respective flexible portions.

4. In a valve comprising a casing having a fixed body with inlet and outlet ports therein, flexible bellows arranged on opposite sides of the body, closing heads for said bellows, said heads being subjected to the same pressure, a valve seat in the body, a valve head for the seat movable with the bellows, and means for effecting simultaneous movement of both bellows so as to prevent movement of the valve head relative to the seat due to pressure changes within the valve chamber.

5. In a valve comprising a plurality of spaced bellows having a valve head movable therewith, a fixed central casing between the bellows having a valve seat therein both of said bellows being arranged on the outlet side of the valve, and means arranged to permit simultaneous contraction and expansion of the respective bellows to change the extent of valve opening.

6. A sealed valve comprising a plurality of oppositely disposed bellows having a valve cone movable with one of the bellows, a central casing fixed between the bellows, a valve seat in the casing, means connecting the bellows so as to neutralize the pressure within the valve chamber tending to move the valve in opposite directions, and means normally tending to hold the cone in one position.

7. A sealed valve including a pair of oppositely disposed flexible members, a valve head movable with one of the members, a valve seat, means normally tending to open the valve, and means connecting said flexible members whereby the valve is balanced and a constant capacity valve chamber is maintained for different valve openings.

8. A valve comprising a pair of oppositely disposed bellows, a body fixed between the bellows and connected thereto forming a valve chamber, a valve seat and valve head within the chamber, one of which is movable with the bellows, and means effecting simultaneous contraction and expansion of the respective bellows.

9. A valve comprising a pair of oppositely disposed bellows, a body between the bellows and connected thereto forming a valve chamber, a valve seat and valve head within the chamber, one of which is movable with the bellows, and means for maintaining the valve chamber of constant volume for different positions of the bellows.

10. A valve comprising a fixed central casing open at opposite sides and having a valve seat, and an inlet port and an outlet port, a pair of bellows each closed at one end, arranged on said opposite sides of the casing and subjected to the same pressure, a valve head movable with one of the bellows, means rigidly connecting the ends of the bellows, and means external of the casing for moving the bellows and valve head.

11. A sealed valve comprising a casing having an inlet and an outlet, a fixed central portion having a valve seat, movable heads connected to said casing on the outlet side of the valve, a valve head movable with said movable heads, and means connecting the movable heads whereby the volume of the chamber formed on the outlet side of the valve is maintained constant for all positions of the valve.

In witness whereof, I have hereunto subscribed my name.

ALFRED W. MELLOWES.